(12) United States Patent
Nahrwold

(10) Patent No.: US 6,997,284 B1
(45) Date of Patent: Feb. 14, 2006

(54) LUBRICANT COOLING SYSTEM FOR A MOTOR VEHICLE AXLE

(75) Inventor: Thomas Nahrwold, Ossian, IN (US)

(73) Assignee: Spicer Technology, Inc., Ft. Wayne, ID (US)

( * ) Notice: Subject to any disclaimer, the term of this patent is extended or adjusted under 35 U.S.C. 154(b) by 611 days.

(21) Appl. No.: 09/888,478

(22) Filed: Jun. 26, 2001

(51) Int. Cl.
*F01M 11/02* (2006.01)
*F01M 9/06* (2006.01)

(52) U.S. Cl. .................. 184/6.12; 184/11.1; 74/606 A; 165/47; 165/117; 165/300

(58) Field of Classification Search ............... 184/6.4, 184/6.12, 6.22, 11.1–11.3, 13.1, 65, 104.1; 74/606 A; 165/47, 115, 117, 300
See application file for complete search history.

(56) References Cited

U.S. PATENT DOCUMENTS

| | | | | |
|---|---|---|---|---|
| 4,854,748 A | * | 8/1989 | Gabelli et al. ............... | 184/6.4 |
| 4,913,107 A | | 4/1990 | Schweiger ............... | 123/41.54 |
| 4,915,192 A | | 4/1990 | Hayashida et al. .......... | 180/309 |
| 5,072,784 A | * | 12/1991 | Stenlund ....................... | 165/47 |
| 5,123,342 A | * | 6/1992 | Camossi ........................ | 184/5 |
| 5,197,929 A | * | 3/1993 | Scheiber et al. ........... | 74/606 A |
| 5,316,106 A | | 5/1994 | Baedke et al. ............. | 184/6.12 |
| 5,453,181 A | | 9/1995 | Dahlback et al. ........... | 210/168 |
| 5,540,300 A | | 7/1996 | Downs et al. ............. | 184/11.2 |
| 5,584,773 A | * | 12/1996 | Kershaw et al. ........... | 184/6.22 |
| 5,622,051 A | * | 4/1997 | Iida et al. ..................... | 60/456 |
| 5,839,327 A | | 11/1998 | Gage .......................... | 74/607 |
| 5,931,218 A | * | 8/1999 | Carlson et al. ............ | 184/6.22 |
| 6,155,135 A | | 12/2000 | Gage et al. ............... | 74/606 A |
| 6,432,018 B1 | * | 8/2002 | Morse et al. ............. | 74/606 A |
| 6,499,565 B1 | * | 12/2002 | Coyle et al. ............... | 184/6.12 |
| 6,502,665 B1 | * | 1/2003 | Brehob ....................... | 184/6.12 |

FOREIGN PATENT DOCUMENTS

DE      2752005 A   *   6/1978

* cited by examiner

*Primary Examiner*—Chong H. Kim
(74) *Attorney, Agent, or Firm*—Berenato, White & Stavish LLC

(57) ABSTRACT

In a driven axle assembly (12) for a motor vehicle that includes a differential housing located substantially in the center of the axle and tubes (16, 17) extending laterally from the differential, surrounding axle shafts (20) and opening into a lubricant reservoir (60) in the differential housing, a system for circulating and cooling axle lubricant includes a cover (26) for closing and sealing the housing having a first aperture into the housing where a ring gear rotates through the lubricant reservoir. The aperture in the cover opens to a chamber that holds lubricant carried through the aperture by the rotating ring gear. Conduit (72) connected by a hydraulic fitting to the chamber has its opposite end connected to an oil cooler mounted on the axle tube. Conduit (78) returns the lubricant to the reservoir in the differential housing. Lubricant flows via a gravity feed through the first conduit into the cooler and back to the housing reservoir via the second conduit, effectively cooling the lubricant without the addition of a pump.

19 Claims, 3 Drawing Sheets

LUBRICANT COOLING SYSTEM FOR A MOTOR VEHICLE AXLE

BACKGROUND OF THE INVENTION

1. Field of the Invention

This invention relates generally to an axle for motor vehicles in which power is transmitted from a driveshaft to axle shafts. More particularly, the invention pertains to a system for circulating and cooling hydraulic lubricant in such an axle.

2. Description of the Prior Art

Hydraulic lubricant held in a reservoir at the bottom of an axle assembly housing near the ring gear of an axle differential is heated due to friction produced at bearings in the housing and by energy transferred to the lubricant from the ring gear as it rotates in the housing through the lubricant reservoir. In addition, the lubricant is heated by radiation from vehicle exhaust systems and high ambient air temperatures.

Axle lubricants are adversely affected by high temperature. Their performance deteriorates gradually when their temperature is excessive. Lubricant deterioration and excessive temperatures can cause the bearing, seals, gears and lubricant to fail causing axle failure and increased costs.

Various techniques have been developed for transferring heat from an axle lubricant so that the operating temperature of the lubricant is maintained at an acceptable temperature. For example, to cool axle lubricant operating in a high torque and high temperature environment, lubricant from the axle reservoir is circulated by an hydraulic pump through an external cooler wherein heat is exchanged to ambient air and the lubricant is returned through a closed hydraulic system to the reservoir in the axle housing. Other prior art describes use of heat pipes to cool lubricant in internal combustion engines and axle housings.

It is known to use an axle housing formed with fins used to increase its surface area and to enhance transfer of heat from the lubricant, which circulates through bearings that support the differential mechanism, to outside air. Pumping action of the differential ring gear circulates lubricant to the heat exchanger, which is formed intrinsically with the axle housing.

Each of the techniques in the prior art for exchanging heat from an hydraulic lubricant to the ambient requires enhanced heat transfer capability, usually in the form of a finned heat exchanger or use of an hydraulic pump, in order to increase the surface area through which heat is exchanged from lubricant to air or to circulate the lubricant at a sufficient flow rate so that an acceptable level of heat transfer occurs. A pump and finned heat transfer surfaces add cost to the system, and the pump adds to the power load. Preferably, an axle lubricant system would include means for transferring a sufficient amount of heat to ambient air without need for an external power source to drive a lubricant pump and without need to enhance heat exchange capabilities of a conventional axle housing.

SUMMARY OF THE INVENTION

It is an object of the present invention to provide a system that cools axle lubricants in an axle housing assembly by using an oil cooler that is external to the axle housing. The system according to the present invention uses inherent pumping action of the ring gear or other impeller rotating through a lubricant reservoir within the differential housing to move lubricant from the reservoir to a chamber located at an elevation relatively high on the differential housing. Axle lubricant is gravity fed through conduits from the cover of the rear axle housing to the external cooler mounted on the axle housing tubes that surround the axle shafts and extend from the differential mechanism to the wheel assemblies. The conduits are connected by hydraulic fittings to the external cooler, through which the lubricant flows inboard and returns to the reservoir at the bottom of the differential housing. The oil cooler is preferably a frame-mount oil cooler placed on the upper rear section of the axle tube. From the oil cooler, oil is fed back into the sump.

In the preferred embodiment, the pumping action is accomplished by the cover plate following the contour of the ring gear. Oil is trapped between the contour of the cover plate and forced to travel in the same direction as the ring gear. When the oil being pumped by the ring gear crosses the oil scrapper/pump outlet, the oil flows into a cavity on the cover plate. The oil cavity captures oil, when the oil in this cavity reaches a predetermined temperature (e.g., above 200° F.) a bimetallic spring retracts opening a valve and allowing oil to flow through the cooler system and back into the sump. The purpose of the valve is to prevent cool oil from flowing into the cooler and then turning into a semi-solid in the cooler where the ambient temperature is very cool.

The system according to the present invention requires no hydraulic pump; instead, lubricant is moved from the reservoir to the chamber in the cover by the action of the differential ring gear rotating in the housing through the lubricant located at the bottom of the housing. Because the elevation of the chamber to which the lubricant is carried by the ring gear is higher than the elevation of the fittings at the outboard end of the tubes, axle lubricant flows by the effect of gravity along the conduits from the chamber into the cooler and back to the sump.

Several advantages result from the lubricant circulation system according to this invention. It is a low cost, efficient and effective system for cooling axle lubricant. This system requires no additional pumping source or heat exchanger. The system permits a retrofit design formed by the cover plate and frame mount oil cooler.

DESCRIPTION OF THE PREFERRED EMBODIMENT

Figure 1:
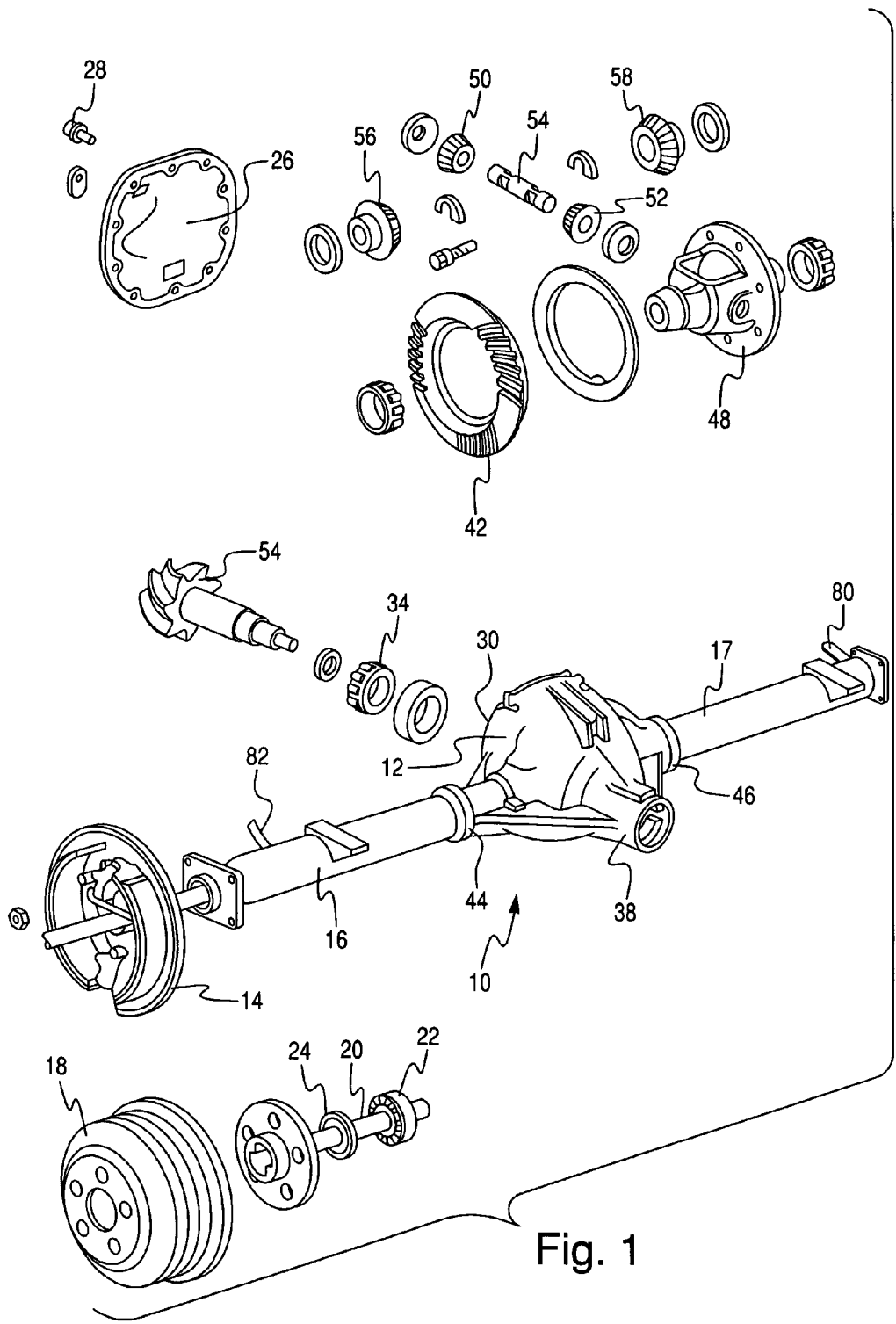
FIG. 1 is a perspective view looking rearward toward an axle assembly incorporating the present invention.

Referring first to FIG. 1, an axle assembly, to which the present invention can be applied, includes axle housing 12, which contains a differential mechanism and a reservoir of hydraulic lubricant; brake assembly 14 located at the end of a tube 16 extending outboard from the ends of the axle housing 12; brake drum 18; axle shaft assembly 20; axle shaft bearing 22; and bearing seal 24.

A cover 26 is connected by bolts 28 to the rear face 30 of the housing 12 hydraulically seals the housing against the passage of lubricant.

Figure 2:
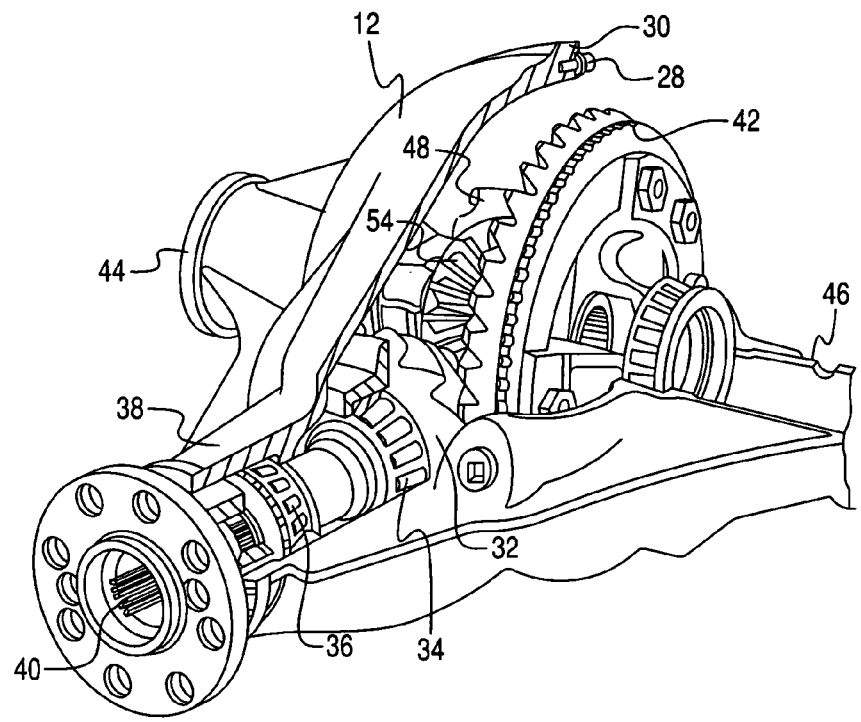
FIG. 2 is a perspective view partially in cross section taken through a plane through the driveshaft and axle assembly of FIG. 1.

Located within the differential case is a drive pinion 32, seen best in FIG. 2, rotatably supported by a rear drive pinion bearing 34 and a front drive pinion bearing 36 supported on the inner surface of a portion of the axle carrier casing 38 that extends forward from the center line of the axle assembly. A driveshaft, driveably connected to the output shaft of a transmission, is connected through spline 40 to the shaft that drive pinion 32.

The differential mechanism, located within the differential case, includes a ring gear 42, in continuous meshing engagement with drive pinion 32 and supported rotatably on differential front drive pinion bearing 34 and rear drive pinion bearing 36 located within the housing gear and cylindrical extension 38 of the housing assembly 12.

The axle carrier assembly 12 also includes laterally directed tubular extensions 44, 46, which receive therein the ends of housing tubes 16 and 17, respectively. Located within the axle assembly 12 is a differential carrier 48, on which bevel pinion gears 50, 52 are supported for rotation on a differential pinion shaft 54. Side bevel gears 56, 58 are in continuous meshing engagement with pinions 50, 52 and are driveably connected to left and right axle shafts 20, located respectively within tubes 16 and 17.

Figure 3:
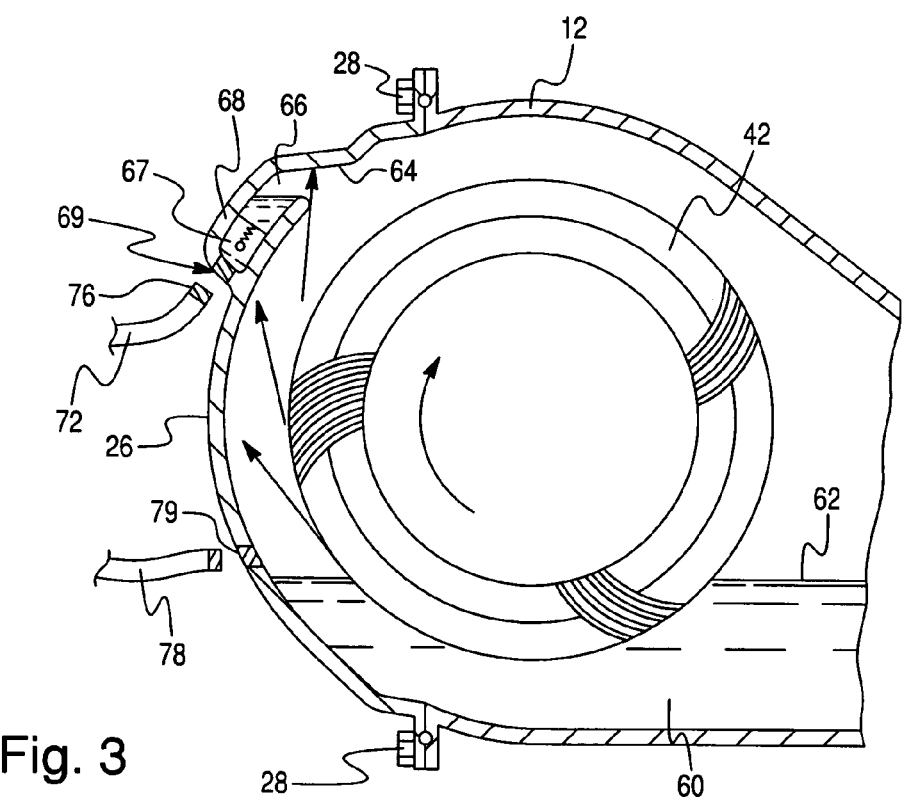
FIG. 3 is a cross section taken at a longitudinal plane through the center of the axle differential of FIG. 2.
Figure 4:
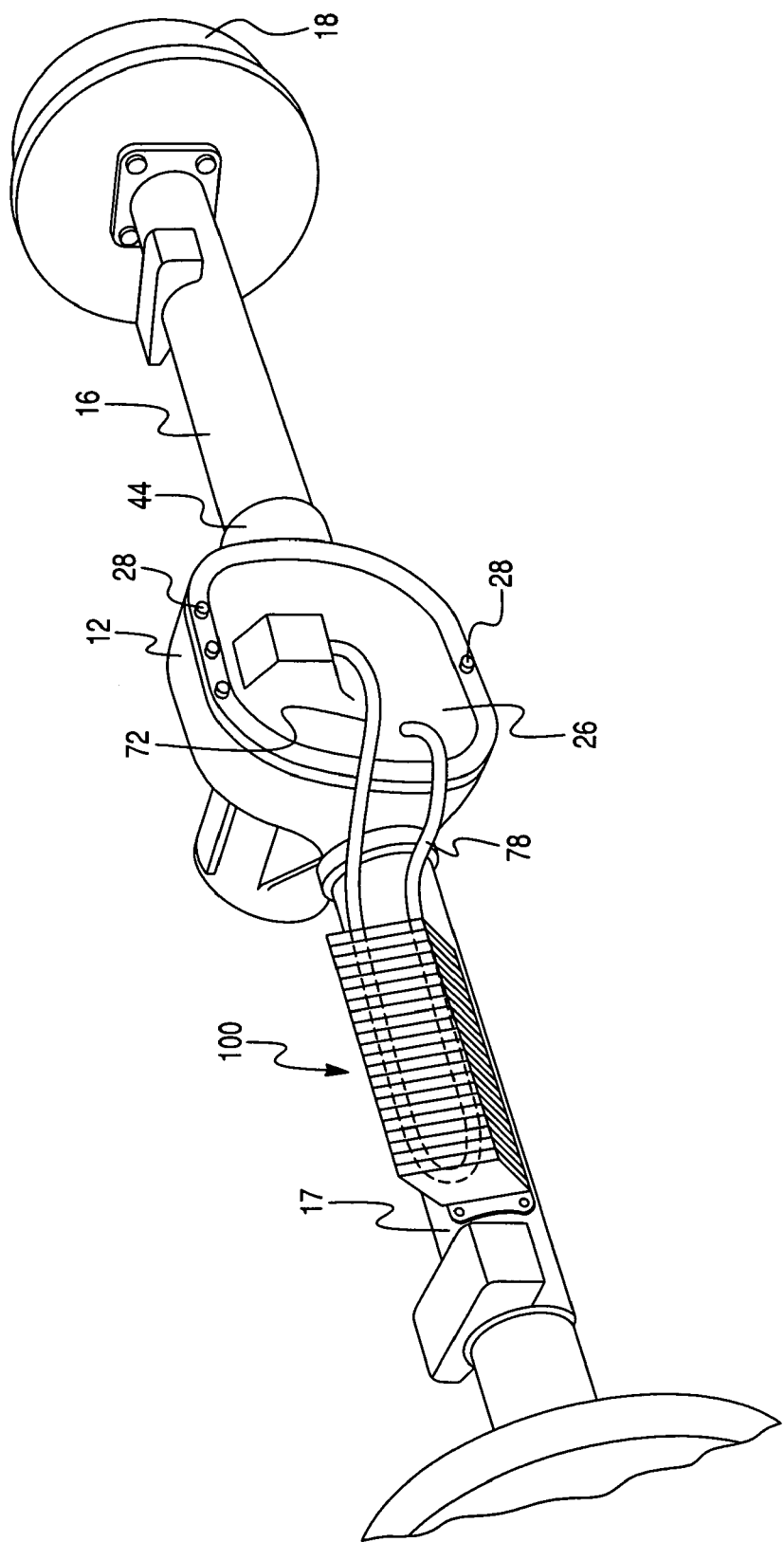
FIG. 4 is a perspective view looking forward toward an axle assembly incorporating the present invention.

FIG. 3 shows ring gear 42, supported rotatably in the axle assembly housing 12, and cover 26, which closes the axle housing. The space enclosed by cover 26 and housing 12 contains a reservoir of hydraulic lubricant 60, whose upper lever 62 is high enough so that ring gear 42 rotates partially in the lubricant. The ring gear rotates clockwise as seen in FIG. 3 partially through the space within the axle assembly that is occupied by the lubricant and partially within the space above the lubricant.

Cover 26 includes an aperture 64 that opens the housing interior into a chamber or oil scrapper/pump outlet 66 adapted to hold lubricant 70 that passes through the aperture from the interior of the axle housing. Chamber 66 is bounded by an outer wall 68 and inner wall formed integrally with other portions of cover 26. As ring gear 42 rotates the beveled teeth of the gear, or slingers fixed to the lateral surface of the gear, carry lubricant from the reservoir 60 and throw it against the inner surface of cover 26 above aperture 64, through which it passes into chamber 66.

Disposed within the chamber 66 is a bimetallic valve/thermostat 67 that controls flow of the lubricant 70 through the opening 69. When the oil reaches a predetermined temperature, for example a temperature above 200° F., a bimetallic spring/thermostat 67 opens allowing the lubricant 70 to gravity feed out of the chamber 66 through the opening 69. While FIG. 3 shows a spring-operated temperature-sensitive valve 67, it will be understood by those of skill in the art that various temperature sensitive valves 67 may be used without departing from the spirit and scope of this invention. Likewise, the invention should not be limited to temperature sensitive valve as shown because many other types of valves (e.g., solenoid, pressure sensitive, electrically operated) may be used without departing from the inventive concept of the instant application.

Mounted at the bottom side of chamber 60 is a conduit 72 extending substantially in the direction of the right-hand axle shaft 20. The conduit 72 comprises a tube connected by a conventional fitting 76 received at opening 69 located at the bottom surfaces of chamber 66 and by fittings provided on the oil cooler 100. The elevation of fitting 76 on chamber 66 is above the elevation of the fitting of the oil cooler 10. Therefore, lubricant flows by gravity from chamber 66 through conduit 72 into oil cooler 100 without a pump or other pressure source. The lubricant 70 is then returned to the reservoir of housing 12 via a second conduit 78 connected to a lower opening 79.

Lubricant enters the oil cooler through the fittings, flows through the cooler 100, and returns to the housing reservoir. The cooler 100 can take many forms but is preferably a two-pass coil cooler provided with cooling fins that increase cooling of the lubricant as the lubricant passes through the main tubes.

As the vehicle moves, a substantial high speed airstream passes over the external surfaces of the cooling fins of the cooler 100. Heat passes through the walls of the tubes and cooling fins to the airstream, thereby producing a substantial reduction in temperature of the lubricant in comparison to the temperature of the lubricant in an identical system that provides no circulation of lubricant through conduits and cooler.

The present invention operates to substantially reduce the operating temperature of lubricant in a drive axle of an automotive vehicle by effectively circulating lubricant without the use of an external fluid power source pump. Lubricant is carried to an oil cooler mounted on the axle tubes that are exposed to a high velocity airstream so that heat in the lubricant is transferred to the airstream without need to provide additional heat transfer surfaces.

From the foregoing description and associated drawings, it is clear that the present invention provides a system that cools axle lubricants in an axle housing assembly by using an oil cooler that is external to the axle housing. The system according to the present invention uses inherent pumping action of the ring gear or other impeller rotating through a lubricant reservoir within the differential housing to move lubricant from the reservoir to a chamber located at an elevation relatively high on the differential housing. Axle lubricant is gravity fed through conduits from the cover of the rear axle housing to the external cooler mounted on the axle housing tubes that surround the axle shafts and extend from the differential mechanism to the wheel assemblies. The conduits are connected by hydraulic fittings to the external cooler, through which the lubricant flows inboard and returns to the reservoir at the bottom of the differential housing.

In the preferred embodiment, the pumping action is accomplished by the cover plate following the contour of the ring gear. Oil is trapped between the contour of the cover plate and forced to travel in the same direction as the ring gear. When the oil being pumped by the ring gear crosses the oil scrapper/pump outlet, the oil flows into a cavity on the cover plate. When the oil reaches a predetermined temperature, a bimetallic spring/thermostat opens allowing the oil to gravity feed through the cooler and back to the sump.

The system according to the present invention requires no hydraulic pump; instead, lubricant is moved from the reservoir to the chamber in the cover by the action of the differential ring gear rotating in the housing through the lubricant located at the bottom of the housing. Gravity forces the lubricant through the delivery system and back to the reservoir. Because the elevation of the chamber to which the lubricant is carried by the ring gear is higher than the elevation of the fittings at the outboard end of the tubes, axle lubricant flows by the effect of gravity along the conduits from the chamber into the cooler and back to the sump.

Several advantages result from the lubricant circulation system according to this invention. It is a low cost, efficient and effective system for cooling axle lubricant. This system requires no additional pumping source or heat exchanger. The system permits a retrofit design formed by the cover plate and frame mount oil cooler.

We claim:

1. A system for circulating lubricant in an assembly, comprising:
   a housing adapted to contain a reservoir of hydraulic lubricant;
   an aperture in the housing to permit lubricant circulation;
   a chamber located adjacent the aperture, adapted to hold lubricant therein, the chamber located at a first elevation;
   a component supported for rotation partially in the lubricant and partially in a portion of the housing located above the lubricant, having means for moving lubricant from the reservoir to the chamber;
   a lubricant cooler disposed outside of said housing; and
   conduit means having a first end hydraulically connected to the chamber and a second end hydraulically connected to said cooler at a location that is distant from the reservoir and at a second elevation lower than the first elevation, for carrying lubricant from the chamber to the cooler, using gravity to transport lubricant from the first elevation to the second elevation, wherein:
   the housing includes first and second axle tubes extending outward in opposite directions from the reservoir; and
   the conduit means includes first and second conduits, the first conduit having a first end connected to the chamber and a second end hydraulically connected to said cooler mounted external the first axle tube of the housing.

2. The system of claim 1, wherein the second conduit has a first end hydraulically connected to the cooler and a second end hydraulically connected to said housing adjacent said reservoir, the second end of the second conduit being located at a third elevation lower than the first and second elevations.

3. The system of claim 1, wherein said conduit means provides a hydraulic loop from said chamber to said cooler and back to said reservoir.

4. The system of claim 1, wherein the cooler is mounted on an exterior of an axle tube extending from said housing.

5. The system of claim 1, further comprising a valve disposed at said chamber for controlling a flow of lubricant to said cooler.

6. The system of claim 5, wherein said valve is a temperature-sensitive flow control element to control flow based at least in part on the temperature of the lubricant.

7. The system of claim 5, wherein said valve comprises a spring member.

8. The system of claim 1, wherein said component is a ring gear.

9. The system of claim 1, wherein said component is an impeller fixed to a rotatable differential case.

10. A system to dissipate heat from lubricant provide within a differential carrier, said system comprising:
    a differential assembly having a lubricant reservoir;
    a carrier cover plate formed with an oil scrapper/pump outlet provided adjacent a rotating member of said differential assembly;
    an oil cooler mounted on an adjacent axle tube; and
    a delivery system to deliver lubricant from said outlet to said oil cooler and back to said reservoir,
    whereby said lubricant is delivered from said carrier through said delivery system to said oil cooler via a gravity feed system.

11. The system of claim 10, wherein said delivery system comprises a first conduit having a first end hydraulically connected to the outlet at a first elevation and a second end hydraulically connected to said cooler at a location that is distant from the reservoir and at a second elevation lower than the first elevation, for carrying lubricant from the chamber to the cooler, using gravity to transport lubricant from the first elevation to the second elevation.

12. The system of claim 11, further comprising a second conduit having a first end hydraulically connected to the cooler and a second end hydraulically connected to said reservoir, the second end of the second conduit being located at a third elevation lower than the first and second elevations.

13. The system of claim 10, wherein said oil scrapper/pump outlet forms a chamber on said cover plate, and wherein said delivery system provides a hydraulic loop from said chamber to said cooler and back to said reservoir.

14. The system of claim 10, wherein the cooler is mounted on an exterior of an axle tube extending from said housing.

15. The system of claim 10, further comprising a valve disposed at said oil scrapper/pump outlet for controlling a flow of lubricant to said cooler.

16. The system of claim 10, wherein said valve is a temperature-sensitive flow control element to control flow based at least in part on the temperature of the lubricant.

17. The system of claim 15, wherein said valve comprises a spring member.

18. The system of claim 10, wherein said component is a ring gear.

19. The system of claim 10, wherein said component is an impeller fixed to a rotatable differential case.

* * * * *